United States Patent
Cao et al.

(10) Patent No.: US 6,914,030 B2
(45) Date of Patent: *Jul. 5, 2005

(54) SYNTHESIS OF SILICOALUMINOPHOSPHATES

(75) Inventors: Guang Cao, Branchburg, NJ (US); Matu J. Shah, Livingston, NJ (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 7 days.

This patent is subject to a terminal disclaimer.

(21) Appl. No.: 10/422,923

(22) Filed: Apr. 24, 2003

(65) Prior Publication Data

US 2003/0232006 A1 Dec. 18, 2003

Related U.S. Application Data

(63) Continuation-in-part of application No. 10/170,293, filed on Jun. 12, 2002, now Pat. No. 6,680,278.

(51) Int. Cl.$^7$ ................................................. B01J 29/06
(52) U.S. Cl. .................. 502/214; 502/208; 423/302; 423/304; 423/305; 423/306; 423/327.1; 423/DIG. 30
(58) Field of Search ................. 423/302, 304, 423/305, 306, 327.1, DIG. 30; 502/208, 214

(56) References Cited

U.S. PATENT DOCUMENTS

| | | | | |
|---|---|---|---|---|
| 4,310,440 A | | 1/1982 | Wilson et al. | 252/435 |
| 4,440,871 A | | 4/1984 | Lok et al. | 502/214 |
| 4,786,487 A | | 11/1988 | Kuehl | 423/306 |
| 4,861,739 A | | 8/1989 | Pellet et al. | 502/64 |
| 5,096,684 A | | 3/1992 | Guth et al. | 423/306 |
| 6,001,328 A | | 12/1999 | Lillerud et al. | 423/718 |
| 6,126,415 A | | 10/2000 | Lasko | 423/706 |
| 6,620,983 B1 | * | 9/2003 | Cao et al. | 585/640 |
| 6,680,278 B2 | * | 1/2004 | Cao et al. | 502/214 |
| 2003/0231999 | * | 12/2003 | Cao et al. | 423/305 |

FOREIGN PATENT DOCUMENTS

| | | | |
|---|---|---|---|
| EP | 0 103 117 | 3/1984 | C01B/33/28 |
| EP | 0 324 082 | 7/1989 | B01J/29/02 |
| EP | 993 867 | 9/2000 | |
| WO | WO 98/15496 | 4/2000 | |
| WO | WO 01/36328 | 5/2001 | |

OTHER PUBLICATIONS

Meier et al., "Atlas of Zeolite Framework Types," Fifth Revised Edition, p. 96 (2001).
E. H. Halvorsen, "Synthesis and Characterization of Aluminophosphate Molecular Sieve" Ph.D. Thesis, University of Oslo, (1996).
Feng et al, Microporous & Mesoporous Materials, vol. 23, No. 3–4, 221–229 (1998).
Pluth et al., J. Phys. Chem. vol. 93 No. 17, pp. 6516–6520 (1989).
Prakash et al., Microporous & Mesoporous Materials, vol. 2, pp. 83–89 (1994).
Zaiqun et al., Microporous & Mesoporous Mat., vol. 22 No. 1–3, pp. 33–41 (1998).
Wilson et al., "The Characteristics of SAPO–34 which Influence the Conversion of Methanol to Light Oelfins," *Microporous and Mesoporous Materials*, vol. 29, pp. 117–126, (1999).

* cited by examiner

*Primary Examiner*—Christina Johnson

(57) ABSTRACT

The invention is directed to a method of synthesizing silicoaluminophosphate molecular sieves using synthesis templates that contain at least one dimethylamino moiety, selected from one or more of N,N-dimethylethanolamine, N,N-dimethylpropanolamine, N,N-dimethylbutanolamine, N,N-dimethylheptanolamine, N,N-dimethylhexanolamine, N,N-dimethylethylenediamine, N,N-dimethylbutylenediamine, N,N-dimethylheptylenediamine, N,N-dimethylhexylenediamine 1-dimethylamino-2-propanol, N,N-dimethylethylamine, N,N-dimethylpropylamine, N,N-dimethylpentylamine, N,N-dimethylhexylamine and N,N-dimethylheptylamine. The use of dimethylamino moiety containing templates results in good quality SAPO molecular sieves of CHA framework type.

17 Claims, 3 Drawing Sheets

SYNTHESIS OF SILICOALUMINOPHOSPHATES

This application is a continuation-in-part of U.S. application Ser. No. 10/170,293, filed Jun. 12, 2002, now U.S. Pat. No. 6,680,278, the disclosure of which is incorporated herein by reference in its entirety.

FIELD OF INVENTION

This invention relates to the synthesis of silicoaluminophosphate molecular sieves of the CHA framework type. In particular the present invention relates to the synthesis of silicoaluminophosphate molecular sieves of the CHA framework type using synthesis templates that contain at least one dimethylamino moiety.

BACKGROUND OF THE INVENTION

Olefins are traditionally produced from petroleum feedstock by catalytic or steam cracking processes. These cracking processes, especially steam cracking, produce light olefin(s) such as ethylene and/or propylene from a variety of hydrocarbon feedstock. It has been known for some time that oxygenates, especially alcohols, e.g. methanol, are convertible into light olefin(s). The preferred methanol conversion process is generally referred to as a methanol-to-olefin(s) process, where methanol is converted to primarily ethylene and propylene in the presence of a molecular sieve.

Some of the most useful molecular sieves for converting methanol to olefin(s) are the metalloaluminophosphates such as the silicoaluminophosphates (SAPO's). There are a wide variety of SAPO molecular sieves known in the art, of these the more important examples include SAPO-5, SAPO-11, SAPO-18, SAPO-34, SAPO-35, SAPO-41, and SAPO-56. For the methanol-to-olefins process SAPO molecular sieves having the CHA framework and especially SAPO-34 are particularly important catalysts. The CHA framework type has a double six-ring structure in an ABC stacking arrangement. The pore openings of the structure are defined by eight member rings that have a diameter of about 4.0 Å, and cylindrical cages within the structure of approximately 10×6.7 Å type ("Atlas of Zeolite Framework Types", 2001, 5th Edition, p. 96). Other SAPO molecular sieves of CHA framework type include SAPO-44, SAPO-47 and ZYT-6.

The synthesis of SAPO molecular sieves is a complicated process. There are a number of variables that need to be controlled in order to optimise the synthesis in terms of purity, yield and quality of the SAPO molecular sieve produced. A particularly important variable is the choice of synthesis template, which usually determines which SAPO framework type is obtained from the synthesis. U.S. Pat. No. 4,310,440 teaches that "not all templating agents suitably employed in the preparation of certain species . . . are suitable for the preparation of all members of the generic class." It is also well known that the same template may induce the formation of different framework types.

In U.S. Pat. No. 4,440,871, the synthesis of a wide variety of SAPO materials of various framework types are described with a number of specific examples. Also disclosed are a large number of possible organic templates, with some specific examples. In the specific examples a number of CHA framework type materials are described. The preparation of SAPO-34 is reported, using tetraethylammonium hydroxide (TEAOH), or isopropylamine, or mixtures of TEAOH and dipropylamine (DPA) as templates. Also disclosed in this patent is a specific example that utilises cyclohexylamine in the preparation of SAPO-44. Although other template materials are described in this patent there are no other templates indicated as being suitable for preparing SAPO's of CHA framework type. Certain aminoalcohols are mentioned, including triethanolamine, N-methyldiethanolamine, N-methylethanolamine, N,N-dimethylethanolamine and N,N-diethylethanolamine as possible templates for SAPO molecular sieves. Of these materials N,N-diethylethanolamine is shown to produce SAPO-5, which is of framework type AFI. For the other aminoalcohols no indication is provided as to which SAPO or which framework type may be obtained through their use.

Since the synthesis of SAPO-34 was reported in U.S. Pat. No. 4,440,871, tetraethylammonium hydroxide (TEAOH) either alone, or in combination with dipropylamine (DPA), has been the preferred template for preparing SAPO-34. However, there are problems associated with the use of TEAOH and DPA. When used alone, TEAOH affords a limited range of synthesis parameters. For example, under certain conditions TEAOH will also template the synthesis of SAPO-18 which has the AEI framework type. TEAOH is thus relatively intolerant to synthesis condition variations. TEAOH is sometimes combined with DPA. However, DPA has a low boiling point (110° C.) resulting in the need for production plants that can handle high pressures. In certain countries, the use of DPA requires special regulatory authorizations due to its toxicity. Also, DPA is an aggressive template and is often implicated in re-dissolution of the silicoaluminophosphate molecular sieve during its synthesis, resulting in poor quality crystalline product due to surface pitting of the crystals. Finally, it has proved difficult up to now to make pure phase CHA silicoaluminophosphate molecular sieves with a low silica to alumina ratio.

In U.S. Pat. No. 4,440,871, it was reported that SAPO-44 was obtained "as the major phase" using cyclohexylamine as a template. In U.S. Pat. No. 6,162,415, relatively pure CHA SAPO-44 was obtained using the same template but with control of the ratio of template to aluminum source and the ratio of phosphorus source to aluminum source.

In EP 0 993 867, it was reported that the use of methylbutylamine resulted in SAPO-47 and the use of cyclohexylamine resulted in impure SAPO-44. Methylbutylamine has an even lower boiling point, at 91° C., than DPA.

In U.S. Pat. No. 4,861,739, Example 102, it was reported that the use of N,N-diethylethanolamine produced CoAPSO-47, having Si concentrated on the peripheries of the crystal and Co at the centre.

In U.S. Pat. No. 4,310,440, triethanolamine, N,N-dimethylethanolamine, N,N-diethylethanolamine, N-methyldiethanolamine, and N-methylethanolamine, were all used to prepare $AlPO_4$-5, aluminophosphates of framework type AFI. N-methylethanolamine was also reported to produce $AlPO_4$-21 of framework type AWO.

In EP 0 993 867, it was reported that diethanolamine produced SAPO-34 and SAPO-5 under different synthesis conditions.

In the art various attempts have been made to improve the synthesis of $AlPO_4$ or SAPO molecular sieves. One approach has been the addition of a source of fluoride ions to the synthesis mixture.

In U.S. Pat. No. 5,096,684, morpholine and tetraethylammonium hydroxide were found to template the production of SAPO-34 when in the presence of HF. According to this reference, the use of HF in combination with the organic template results in silicoaluminophosphates which have improved thermal and hydrolytic stability.

In U.S. Pat. No. 4,786,487, SAPO-20 was produced from synthesis mixtures containing tetramethylammonium hydroxide and fluoride ions from water soluble sources of fluoride such as Na, K and ammonium fluoride.

In U.S. Pat. No. 6,001,328, a silicoaluminophosphate indicated as UiO-S7 was prepared using tetramethylammonium hydroxide pentahydrate or tetramethylammonium hydroxide, in combination with HF.

In a Ph.D. thesis (E. H. Halvorsen, University of Oslo, 1996), it was reported that low silica SAPO-34, designated as UiO-S4, was produced using TEAOH template in combination with HF.

Wilson et al., reported that it is beneficial to have lower Si content for methanol-to-olefins reaction (Microporous and Mesoporous Materials, 29, 117–126, 1999). Low Si content has the effect of reducing propane formation and decreasing catalyst deactivation.

As can bee seen from the disclosures described herein, there have been a number of attempts to utilise alternative synthesis templates for the CHA framework type, with limited success. It is desirable therefore to find new synthesis templates that are specific for the synthesis of silicoaluminophosphate molecular sieves of CHA framework type. In addition there is a need for new templating systems which afford more effective control of the final composition of the SAPO and in particular the Si/Al (silicon to aluminum atomic) ratio in the final product, which is related to and often expressed as the number of Si atoms per CHA cage of the molecular sieve, each CHA cage being composed of 12 T atoms (T atoms are either Si, Al or P).

SUMMARY OF THE INVENTION

The present invention provides a process for preparing a crystalline silicoaluminophosphate molecular sieve of CHA framework type, the process comprising: (a) forming a reaction mixture comprising a source of aluminum, a source of phosphorus, a source of silicon and at least one organic template which comprises one or more dimethylamino moieties; and (b) inducing crystallization of crystalline molecular sieve of CHA framework type from the reaction mixture.

The process of the present invention results in new silicoaluminophosphate compositions with the CHA framework type that, as synthesized, have unique X-Ray diffraction patterns.

In one embodiment of the present invention there is provided a silicoaluminophosphate molecular sieve, substantially of CHA framework type, comprising within its intra-crystalline structure at least one template which contains one or more N,N-dimethylamino moieties.

In one embodiment of the present invention there is provided a silicoaluminophosphate molecular sieve, substantially of CHA framework type, comprising N,N-dimethylethanolamine within its intra-crystalline structure. In a further embodiment of the present invention there is provided a crystalline silicoaluminophosphate molecular sieve substantially of CHA framework type, having a characteristic X-ray powder diffraction pattern containing at least the d-spacings as set forth in Table Ia:

TABLE 1a

| 2 θ | d (Å) | I (%) |
|---|---|---|
| 9.461 | 9.34 | 65 |
| 12.88 | 6.87 | 14 |
| 13.879 | 6.38 | 11 |
| 16.018 | 5.53 | 50 |

TABLE 1a-continued

| 2 θ | d (Å) | I (%) |
|---|---|---|
| 17.619 | 5.03 | 22 |
| 20.62 | 4.30 | 100 |
| 21.9 | 4.06 | 17 |
| 23.039 | 3.86 | 15 |
| 24.74 | 3.59 | 47 |
| 25.96 | 3.43 | 20 |
| 30.66 | 2.91 | 45 |
| 30.939 | 2.89 | 23 |

Preferably, the present invention provides a crystalline silicoaluminophosphate molecular sieve substantially of CHA framework type, having a characteristic X-ray powder diffraction pattern containing at least the d-spacings as set forth in Table Ib:

TABLE Ib

| 2 θ | d (Å) | I (%) |
|---|---|---|
| 9.461 | 9.34 | 65 |
| 12.88 | 6.87 | 14 |
| 13.879 | 6.38 | 11 |
| 16.018 | 5.53 | 50 |
| 17.619 | 5.03 | 22 |
| 18.999 | 4.67 | 7 |
| 20.62 | 4.30 | 100 |
| 21.9 | 4.06 | 17 |
| 22.423 | 3.96 | 7 |
| 23.039 | 3.86 | 15 |
| 24.74 | 3.59 | 47 |
| 25.96 | 3.43 | 20 |
| 27.7 | 3.22 | 8 |
| 28.015 | 3.18 | 4 |
| 29.563 | 3.02 | 5 |
| 30.66 | 2.91 | 45 |
| 30.939 | 2.89 | 23 |
| 31.54 | 2.83 | 3 |
| 32.397 | 2.76 | 2 |
| 33.281 | 2.69 | 5 |
| 34.581 | 2.59 | 7 |
| 34.995 | 2.56 | 3 |
| 35.822 | 2.50 | 8 |
| 38.398 | 2.34 | 1 |
| 38.543 | 2.33 | 1 |
| 39.401 | 2.28 | 1 |
| 39.761 | 2.27 | 3 |

It is preferred that the molecular sieve having the X-ray diffraction pattern of Table Ia or Ib comprises N,N-dimethylethanolamine within its intra-crystalline structure.

In a further embodiment of the present invention there is provided a silicoaluminophosphate molecular sieve, substantially of CHA framework type, comprising N,N-dimethylpropanolamine within its intra-crystalline structure. There is also provided a microporous crystalline silicoaluminophosphate molecular sieve substantially of CHA framework type, having a characteristic X-ray powder diffraction pattern containing at least the d-spacings as set forth in Table IIa:

TABLE IIa

| 2 θ | d (Å) | I (%) |
|---|---|---|
| 9.357 | 9.44 | 67 |
| 12.719 | 6.95 | 17 |
| 15.858 | 5.58 | 50 |
| 17.637 | 5.02 | 31 |
| 20.438 | 4.34 | 100 |

TABLE IIa-continued

| 2 θ | d (Å) | I (%) |
|---|---|---|
| 21.858 | 4.06 | 17 |
| 22.866 | 3.89 | 13 |
| 24.798 | 3.59 | 63 |
| 25.721 | 3.46 | 21 |
| 30.438 | 2.93 | 46 |
| 30.658 | 2.91 | 20 |
| 30.917 | 2.89 | 26 |

Preferably, the present invention provides a crystalline silicoaluminophosphate molecular sieve substantially of CHA framework type, having a characteristic X-ray powder diffraction pattern containing at least the d-spacings as set forth in Table IIb:

TABLE IIb

| 2 θ | d (Å) | I (%) |
|---|---|---|
| 9.357 | 9.44 | 67 |
| 12.719 | 6.95 | 17 |
| 13.819 | 6.40 | 8 |
| 15.858 | 5.58 | 50 |
| 17.637 | 5.02 | 31 |
| 18.882 | 4.70 | 5 |
| 20.438 | 4.34 | 100 |
| 21.858 | 4.06 | 17 |
| 22.222 | 4.00 | 5 |
| 22.866 | 3.89 | 13 |
| 24.798 | 3.59 | 63 |
| 25.721 | 3.46 | 21 |
| 27.481 | 3.24 | 7 |
| 28.037 | 3.18 | 9 |
| 29.363 | 3.04 | 3 |
| 30.438 | 2.93 | 46 |
| 30.658 | 2.91 | 20 |
| 30.917 | 2.89 | 26 |
| 31.418 | 2.85 | 4 |
| 32.139 | 2.78 | 3 |
| 33.299 | 2.69 | 4 |
| 34.317 | 2.61 | 9 |
| 34.777 | 2.58 | 2 |
| 35.877 | 2.50 | 8 |
| 39.481 | 2.28 | 4 |
| 42.641 | 2.12 | 6 |
| 43.241 | 2.09 | 5 |
| 47.479 | 1.91 | 5 |
| 48.623 | 1.87 | 6 |
| 49.142 | 1.85 | 4 |

It is preferred that the molecular sieve having the X-ray diffraction pattern of Tables IIa or IIb comprises N,N-dimethylpropanolamine within its intra-crystalline structure.

In a further embodiment of the present invention there is provided a silicoaluminophosphate molecular sieve, substantially of CHA framework type, comprising 1-dimethylamino-2-propanol within its intra-crystalline structure. There is also provided a crystalline silicoaluminophosphate molecular sieve substantially of CHA framework type, having a characteristic X-ray powder diffraction pattern containing at least the d-spacings as set forth in Table IIIa:

TABLE IIIa

| 2 θ | d (Å) | I (%) |
|---|---|---|
| 9.354 | 9.45 | 73 |
| 12.698 | 6.97 | 16 |
| 13.821 | 6.40 | 14 |

TABLE IIIa-continued

| 2 θ | d (Å) | I (%) |
|---|---|---|
| 15.84 | 5.59 | 50 |
| 17.644 | 5.02 | 21 |
| 20.417 | 4.35 | 100 |
| 21.862 | 4.06 | 10 |
| 24.838 | 3.58 | 43 |
| 25.699 | 3.46 | 19 |
| 30.399 | 2.94 | 36 |
| 30.922 | 2.89 | 16 |

Preferably, the present invention provides a crystalline silicoaluminophosphate molecular sieve substantially of CHA framework type, having a characteristic X-ray powder diffraction pattern containing at least the d-spacings as set forth in Table IIIb:

TABLE IIIb

| 2 θ | d (Å) | I (%) |
|---|---|---|
| 9.354 | 9.45 | 73 |
| 12.698 | 6.97 | 16 |
| 13.821 | 6.40 | 14 |
| 15.84 | 5.59 | 50 |
| 17.644 | 5.02 | 21 |
| 18.878 | 4.70 | 2 |
| 20.417 | 4.35 | 100 |
| 21.862 | 4.06 | 10 |
| 22.183 | 4.00 | 4 |
| 22.845 | 3.89 | 8 |
| 24.838 | 3.58 | 43 |
| 25.699 | 3.46 | 19 |
| 27.458 | 3.25 | 5 |
| 28.037 | 3.18 | 4 |
| 30.399 | 2.94 | 36 |
| 30.922 | 2.89 | 16 |
| 34.28 | 2.61 | 8 |
| 35.917 | 2.50 | 6 |
| 39.463 | 2.28 | 4 |
| 42.644 | 2.12 | 3 |
| 43.219 | 2.09 | 3 |
| 47.401 | 1.92 | 4 |
| 48.662 | 1.87 | 5 |

It is preferred that the molecular sieve having the X-ray diffraction pattern of Tables IIIa or IIIb comprises 1-dimethylamino-2-propanol within its intra-crystalline structure.

In another embodiment the present invention provides a method for the manufacture of a molecular sieve catalyst composition, which method comprises forming a mixture comprising at least one molecular sieve of the present invention, with at least one formulating agent, to form a molecular sieve catalyst composition.

In yet a further embodiment the present invention provides for a molecular sieve catalyst composition comprising at least one silicoaluminophosphate molecular sieve of the present invention in admixture with at least one formulating agent.

In a further embodiment the present invention provides for the use of a template comprising one or more dimethylamino moieties in the synthesis of silicoaluminophosphates of CHA framework type.

In another embodiment the present invention provides a method for the manufacture of a molecular sieve catalyst composition, which method comprises forming a mixture comprising at least one molecular sieve comprising within its intra-crystalline structure at least one template which contains one or more N,N-dimethylamino moieties or as obtained from a process utilising a template comprising one or more dimethylamino moieties, with at least one formulating agent, to form a molecular sieve catalyst composition.

In yet a further embodiment the present invention provides for a molecular sieve catalyst composition comprising at least one silicoaluminophosphate molecular sieve comprising within its intra-crystalline structure at least one template which contains one or more N,N-dimethylamino moieties or as obtained from a process utilising a template comprising one or more dimethylamino moieties, in admixture with at least one formulating agent.

DETAILED DESCRIPTION OF THE INVENTION

Introduction

Figure 1:
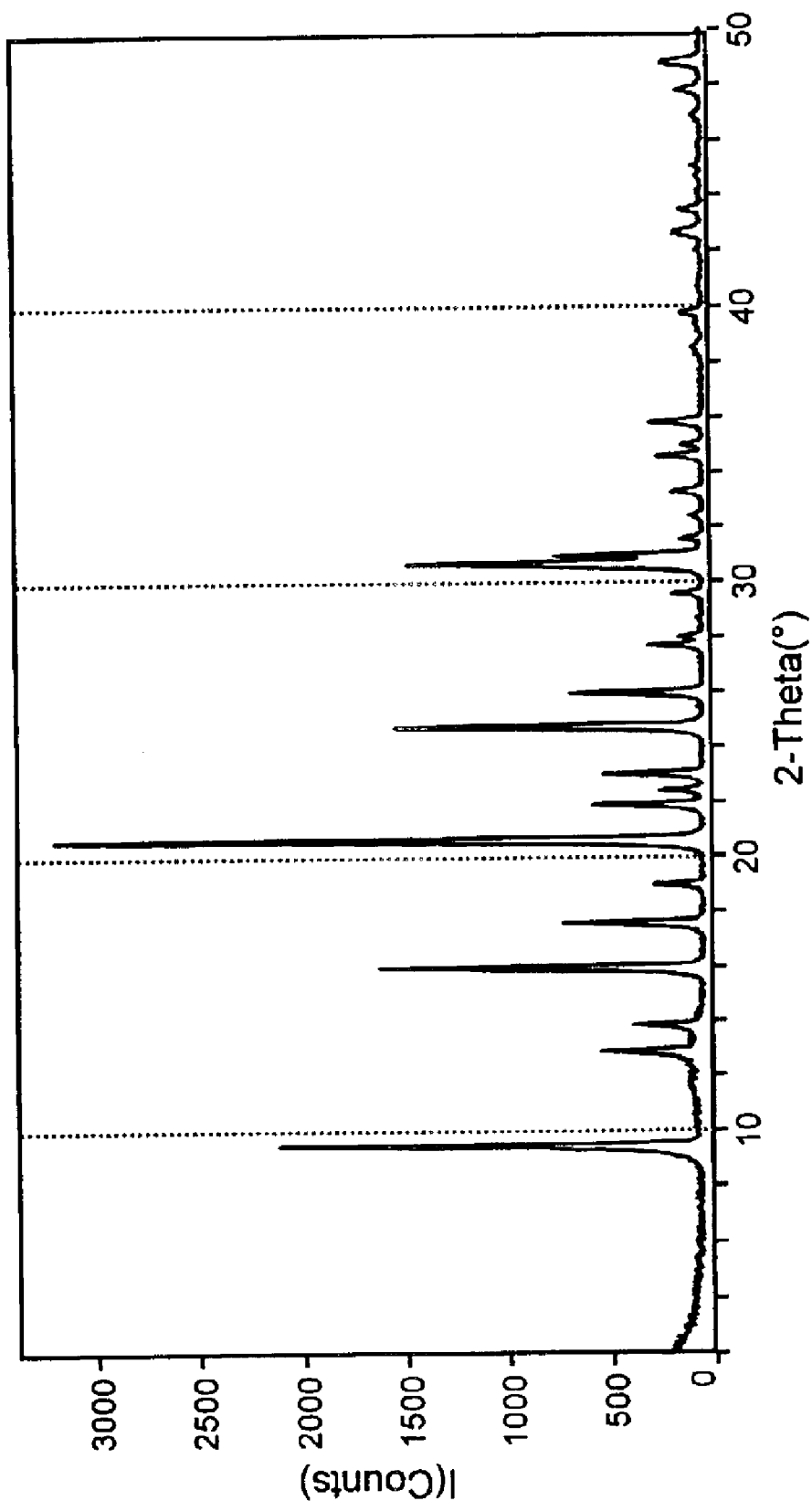
FIG. 1 shows the XRD pattern of a crystalline silicoaluminophosphate molecular sieve of CHA framework type comprising N,N-dimethylethanolamine within its intra-crystalline structure.

The invention is primarily directed toward a method for synthesising silicoaluminophosphates substantially of the CHA framework type. In particular it has been found that a specific group of organic amines are effective templates in the synthesis of silicoaluminophosphate molecular sieves of the CHA framework type. Through the use of these templates it is possible to prepare silicoaluminophosphates of CHA framework type without introducing significant impurities of other framework types in the molecular sieve. It has been found that if templates are used, which contain one or more dimethylamino moieties, then SAPOs of CHA framework type and of substantially high purity are obtained. Furthermore these templates may be utilised with other known templates for the synthesis of SAPOs of CHA framework type in a dual template synthesis to produce SAPOs of CHA framework type with low acidity. In particular they may be utilised in combination with tetraethylammonium hydroxide or chloride templates in place of DPA, to produce SAPO of CHA framework type of low acidity and relatively low silicon content.

Molecular Sieves

The SAPO molecular sieves of the present invention, may be represented by the empirical formula, on an anhydrous basis:

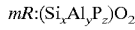

wherein R represents at least one templating agent comprising one or more dimethylamino moieties; m is the number of moles of R per mole of $(Si_xAl_yP_z)O_2$ and m has a value from 0.0417 to 0.3333, preferably from 0.0833 to 0.25, and most preferably from 0.125 to 0.1667; x, y, and z respectively represent the mole fraction of Si, Al and P as tetrahedral oxides.

In one embodiment, m is greater than or equal to 0.04, and x, y and z are greater than or equal to 0.01. In another embodiment, m is in the range of from greater than 0.01 to about 1, x is in the range of from greater than 0 to about 0.31, y is in the range of from 0.25 to 1.0, and z is in the range of from 0.25 to 0.9, more preferably m is in the range of from 0.1 to 0.25, x is in the range of from 0.01 to 0.2, most preferably from 0.01 to 0.2, y is in the range of from 0.4 to 1.0, and z is in the range of from 0.3 to 0.9.

When the molecular sieves are calcined the organic template is removed and the resulting silicoaluminophosphates have a CHA framework type and are of substantially high purity in terms of their framework type with little or no inter-growth with other silicoaluminophosphate or aluminophosphate framework types. In the present specification when reference is made to a silicoaluminophosphate substantially of CHA framework type or of substantially high purity in terms of their framework type it is meant a silicoaluminophosphate molecular sieve which comprises 60% or greater of the CHA framework type, preferably 70% or greater of CHA framework type and most preferably 90% or greater of the CHA framework type as determined by XRD. It is also within the scope of the present invention to provide crystalline silicoaluminophosphate molecular sieves, which are a mixture of two different frameworks. In this embodiment, the molecular sieve may be an intergrowth material having two or more distinct phases of crystalline frameworks within one molecular sieve composition. In another embodiment, the molecular sieve comprises at least one intergrown phase of AEI and CHA framework types. For example, SAPO-18, AlPO$_4$-18 and RUW-18 have an AEI framework type, and SAPO-34 has a CHA framework type. In a further embodiment the molecular sieve may comprise a mixture of intergrown material and non-intergrown materials.

As used herein, the term mixture is synonymous with combination and is considered a composition of matter having two or more components in varying proportions, regardless of their physical state. In particular, it encompasses physical mixtures as well as intergrowths of at least two different molecular sieve frameworks; such as for example those described in WO 98/15496 and U.S. Application Publication No. 20020165089.

Molecular Sieve Synthesis

Generally, silicoaluminophosphate molecular sieves are synthesized by the hydrothermal crystallization of one or more of a source of aluminum, a source of phosphorus, a source of silicon, and a templating agent (or template). Typically, in the method of the present invention a combination of a source of aluminum, a source of phosphorus, one or more templating agents and, optionally, one or more metal containing compounds are placed in a sealed pressure vessel, optionally lined with an inert plastic such as polytetrafluoroethylene, and heated, under a crystallization pressure and temperature, until a crystalline material is formed, and then recovered by filtration, centrifugation and/or decanting.

In a typical synthesis of the molecular sieve, the phosphorus-, aluminum-, and silicon-containing components are mixed, preferably while stirring and/or agitation and/or seeding with a crystalline material, optionally with an alkali metal, in a solvent such as water, and one or more templating agents, to form a synthesis mixture that is then heated under crystallization conditions of pressure and temperature as described in U.S. Pat. No. 4,440,871.

In the process of the present invention, the template is used in an amount such that the ratio of template to alumina (Al$_2$O$_3$) in the reaction mixture is within the range of from 1.0:1.0 to 3.0:1.0, preferably from 1.5:1.0 to 3.0:1.0.

The templates used in the process of the present invention contain one or more dimethylamino moieties and preferably have the general structure $(CH_3)_2N-R$, wherein R is a substituted or un-substituted aliphatic or cycloaliphatic group. R may be a linear or branched alkyl group, or a linear or branched alcohol or a linear or branched amine-containing group. Preferably, R contains an alkyl group of from 1 to 12 carbon atoms, more preferably 1 to 6 carbon atoms, and most preferably 1 to 5 carbon atoms.

In a more preferred embodiment the template is a selected from one or more of the following: N,N-dimethylamino compounds: N,N-dimethylethanolamine, N,N-dimethylpropanolamine, N,N-dimethylbutanolamine, N,N-dimethylheptanolamine, N,N-dimethylhexanolamine, N,N-dimethylethylenediamine, N,N-dimethylpropyelene-diamine, N,N-dimethylbuytlenediamine, N,N-dimethylheptylenediamine, N,N-dimethylhexylenediamine 1-dimethylamino-2-propanol, or dimethylethylamine, dimethylpropylamine, dimethylpentylamine, dimethylhexylamine or dimethylheptylamine. More preferably the template is selected from one or more of the following: N,N-dimethylamino compounds: N,N-dimethylethanolamine, N,N-dimethylpropanolamine, N,N-dimethylpropyelene-diamine, or 1-dimethylamino-2-propanol. Most preferably the template is N,N-dimethylethanolamine or 1-dimethylamino-2-propanol.

In a further embodiment the template comprising one or more dimethylamino moieties may be used in combination with one or more additional templates normally used in the manufacture of silicoaluminophosphates of CHA framework type. These additional templates include: the group of tetraethylammonium compounds, such as tetraethylammonium hydroxide (TEAOH), tetraethylammonium phosphate, tetraethylammonium fluoride, tetraethylammonium bromide, tetraethylammonium chloride and tetraethylammonium acetate and also include DPA, isopropylamine, cyclohexylamine, morpholine, methylbutylamine, diethanolamine, and triethylamine. When these additional templates are used in combination with templates comprising one or more dimethylamino moieties, it is possible to produce new silicoaluminophosphates of CHA framework type, which have a low silicon/cage ratio, which is desirable when these materials are used as catalysts in the methanol-to-olefins process.

Typically, when templates comprising one or more dimethylamino moieties are used the resulting silicoaluminophosphates have a Si per CHA cage ratio within the range of from 1 to 2. When tetraethylammonium hydroxide is used as the sole organic templating material, Si per CHA cage values approximating to 1 are normally obtained.

Typically, when the templates comprising one or more dimethylamino moieties are used in combination with the additional templates described above it is possible to achieve Si per CHA cage ratios within the range 1 to 1.3, and even some with an Si per CHA cage of less than 1. The preferred combination of templates in this context is the combination of N,N-dimethylethanolamine with tetraethylammonium hydroxide or tetraethylammonium chloride or bromide, preferably chloride, providing Si per CHA cage ratios of less than 1.

In one embodiment, the calcined molecular sieve has a Si/Al ratio of less than 0.50, preferably less than 0.40, more preferably less than 0.33, even more preferably less than 0.20 and most preferably less than 0.17. In a preferred embodiment the Si/Al ratio in the molecular sieve is within the range of from 0.01 to 0.33, more preferably in the range of from 0.02 to 0.20, even more preferably in the range of from 0.05 to 0.17 and most preferably in the range of from 0.05 to 0.155.

Method for Making Molecular Sieve Catalyst Compositions

The silicoaluminophosphate molecular sieves of the present invention may be combined with one or more formulating agents, to form a molecular sieve catalyst composition or a formulated molecular sieve catalyst composition. The formulating agents may be one or more materials selected from the group consisting of binding agents, matrix or filler materials, catalytically active materials and mixtures thereof. This formulated molecular sieve catalyst composition is formed into useful shape and sized particles by well-known techniques such as spray drying, pelletizing, extrusion, and the like.

There are many different binders that are useful in forming the molecular sieve catalyst composition. Non-limiting examples of binders that are useful alone or in combination include various types of hydrated alumina, silicas, and/or other inorganic oxide sol. One preferred alumina containing sol is aluminum chlorhydrol. The inorganic oxide sol acts like glue binding the synthesized molecular sieves and other materials such as the matrix together, particularly after thermal treatment. Upon heating, the inorganic oxide sol, preferably having a low viscosity, is converted into an inorganic oxide matrix component. For example, an alumina sol will convert to an aluminum oxide matrix following heat treatment.

Aluminum chlorhydrol, a hydroxylated aluminum based sol containing a chloride counter ion, has the general formula of $Al_mO_n(OH)_oCl_p \cdot x(H_2O)$ wherein m is 1 to 20, n is 1 to 8, o is 5 to 40, p is 2 to 15, and x is 0 to 30. In one embodiment, the binder is $Al_{13}O_4(OH)_{24}Cl_7 \cdot 12(H_2O)$ as is described in G. M. Wolterman, et al., Stud. Surf. Sci. and Catal., 76, pages 105–144 (1993). In another embodiment, one or more binders are combined with one or more other non-limiting examples of alumina materials such as aluminum oxyhydroxide, γ-alumina, boehmite, diaspore, and transitional aluminas such as α-alumina, β-alumina, γ-alumina, δ-alumina, ε-alumina, κ-alumina, and ρ-alumina, aluminum trihydroxide, such as gibbsite, bayerite, nordstrandite, doyelite, and mixtures thereof.

In another embodiment, the binders are alumina sols, predominantly comprising aluminum oxide, optionally including some silicon. In yet another embodiment, the binders are peptised alumina made by treating alumina hydrates such as pseudobohemite, with an acid, preferably an acid that does not contain a halogen, to prepare sols or aluminum ion solutions. Non-limiting examples of commercially available colloidal alumina sols include Nalco 8676 available from Nalco Chemical Co., Naperville, Ill., and Nyacol available from The PQ Corporation, Valley Forge, Pa.

The metalloaluminophosphate molecular sieve may be combined with one or more matrix material(s). Matrix materials are typically effective in reducing overall catalyst cost, act as thermal sinks assisting in shielding heat from the catalyst composition for example during regeneration, densifying the catalyst composition, increasing catalyst strength such as crush strength and attrition resistance, and to control the rate of conversion in a particular process.

Non-limiting examples of matrix materials include one or more of the following: rare earth metals, metal oxides including titania, zirconia, magnesia, thoria, beryllia, quartz, silica or sols, and mixtures thereof, for example silica-magnesia, silica-zirconia, silica-titania, silica-alumina and silica-alumina-thoria. In one embodiment, matrix materials are natural clays such as those from the families of montmorillonite and kaolin. These natural clays include sabbentonites and those kaolins known as, for example, Dixie, McNamee, Georgia and Florida clays. Non-limiting examples of other matrix materials include: haloysite, kaolinite, dickite, nacrite, or anauxite. In one embodiment, the matrix material, preferably any of the clays, are subjected to well known modification processes such as calcination and/or acid treatment and/or chemical treatment.

In one preferred embodiment, the matrix material is a clay or a clay-type composition, preferably the clay or clay-type composition having a low iron or titania content, and most preferably the matrix material is kaolin. Kaolin has been found to form a pumpable, high solid content slurry; it has a low fresh surface area, and it packs together easily due to its platelet structure. A preferred average particle size of the matrix material, most preferably kaolin, is from about 0.1 $\mu$m to about 0.6 $\mu$m with a D90 particle size distribution of less than about 1 $\mu$m.

In one embodiment, the binder, the molecular sieve and the matrix material are combined in the presence of a liquid to form a molecular sieve catalyst composition, where the amount of binder is from about 2 wt % to about 30 wt %, preferably from about 5 wt % to about 20 wt %, and more preferably from about 7 wt % to about 15 wt %, based on the total weight of the binder, the molecular sieve and matrix material, excluding the liquid (after calcination).

In another embodiment, the weight ratio of the binder to the matrix material used in the formation of the molecular sieve catalyst composition is from 0:1 to 1:15, preferably 1:15 to 1:5, more preferably 1:10 to 1:4, and most preferably 1:6 to 1:5. It has been found that a higher sieve content, lower matrix content, increases the molecular sieve catalyst composition performance, however, lower sieve content, higher matrix material, improves the attrition resistance of the composition.

Upon combining the molecular sieve and the matrix material, optionally with a binder, in a liquid to form a slurry, mixing, preferably rigorous mixing is needed to produce a substantially homogeneous mixture containing the molecular sieve. Non-limiting examples of suitable liquids include one or a combination of water, alcohol, ketones, aldehydes, and/or esters. The most preferred liquid is water. In one embodiment, the slurry is colloid-milled for a period of time sufficient to produce the desired slurry texture, sub-particle size, and/or sub-particle size distribution.

The molecular sieve and matrix material, and the optional binder, may be in the same or different liquid, and may be combined in any order, together, simultaneously, sequentially, or a combination thereof. In the preferred embodiment, the same liquid, preferably water is used. The molecular sieve, matrix material, and optional binder, are combined in a liquid as solids, substantially dry or in a dried form, or as slurries, together or separately. If solids are added together as dry or substantially dried solids, it is preferable to add a limited and/or controlled amount of liquid.

In one embodiment, the slurry of the molecular sieve, binder and matrix materials is mixed or milled to achieve a sufficiently uniform slurry of sub-particles of the molecular sieve catalyst composition that is then fed to a forming unit that produces the molecular sieve catalyst composition. In a preferred embodiment, the forming unit is spray dryer. Typically, the forming unit is maintained at a temperature sufficient to remove most of the liquid from the slurry, and from the resulting molecular sieve catalyst composition. The resulting catalyst composition when formed in this way takes the form of microspheres.

When a spray drier is used as the forming unit, typically, the slurry of the molecular sieve and matrix material, and optionally a binder, is co-fed to the spray drying volume with a drying gas with an average inlet temperature ranging from 200° C. to 550° C., and a combined outlet temperature ranging from 100° C. to about 225° C. In an embodiment, the average diameter of the spray dried formed catalyst composition is from about 40 $\mu$m to about 300 $\mu$m, preferably from about 50 $\mu$m to about 250 $\mu$m, more preferably from about 50 $\mu$m to about 200 $\mu$m, and most preferably from about 65 $\mu$m to about 90 $\mu$m.

During spray drying, the slurry is passed through a nozzle distributing the slurry into small droplets, resembling an aerosol spray into a drying chamber. Atomization is achieved by forcing the slurry through a single nozzle or multiple nozzles with a pressure drop in the range of from 100 psia to 1000 psia (690 kPaa to 6895 kPaa). In another embodiment, the slurry is co-fed through a single nozzle or multiple nozzles along with an atomisation fluid such as air, steam, flue gas, or any other suitable gas.

In yet another embodiment, the slurry described above is directed to the perimeter of a spinning wheel that distributes the slurry into small droplets, the size of which is controlled by many factors including slurry viscosity, surface tension, flow rate, pressure, and temperature of the slurry, the shape and dimension of the nozzle(s), or the spinning rate of the wheel. These droplets are then dried in a co-current or counter-current flow of air passing through a spray drier to form a substantially dried or dried molecular sieve catalyst composition, more specifically a molecular sieve in powder form.

Generally, the size of the powder is controlled to some extent by the solids content of the slurry. However, control of the size of the catalyst composition and its spherical characteristics are controllable by varying the slurry feed properties and conditions of atomisation.

In another embodiment, the formulated molecular sieve catalyst composition contains from about 1% to about 99%, more preferably from about 5% to about 90%, and most preferably from about 10% to about 80%, by weight of the molecular sieve based on the total weight of the molecular sieve catalyst composition.

In another embodiment, the weight percent of binder in or on the spray dried molecular sieve catalyst composition based on the total weight of the binder, molecular sieve, and matrix material is from about 2 wt % to about 30 wt %, preferably from about 5 wt % to about 20 wt %, and more preferably from about 7 wt % to about 15 wt %.

Once the molecular sieve catalyst composition is formed in a substantially dry or dried state, to further harden and/or activate the formed catalyst composition, a heat treatment such as calcination, at an elevated temperature is usually performed. A conventional calcination environment is air that typically includes a small amount of water vapour. Typical calcination temperatures are in the range from about 400° C. to about 1000° C., preferably from about 500° C. to about 800° C., and most preferably from about 550° C. to about 700° C., preferably in a calcination environment such as air, nitrogen, helium, flue gas (combustion product lean in oxygen), or any combination thereof.

In one embodiment, calcination of the formulated molecular sieve catalyst composition is carried out in any number of well known devices including rotary calciners, fluid bed calciners, batch ovens, and the like. Calcination time is typically dependent on the degree of hardening of the molecular sieve catalyst composition and the temperature.

In a preferred embodiment, the molecular sieve catalyst composition is heated in nitrogen at a temperature of from about 600° C. to about 700° C. Heating is carried out for a period of time typically from 30 minutes to 15 hours, preferably from 1 hour to about 10 hours, more preferably from about 1 hour to about 5 hours, and most preferably from about 2 hours to about 4 hours.

In addition to the metalloaluminophosphate molecular sieve, the catalyst compositions of the present invention may comprise one or several other catalytically active materials. In one embodiment, one or several metalloaluminophosphate molecular sieves are combined with one more of the following non-limiting examples of catalytically active molecular sieves described in the following, where the numbers in parentheses are U.S. Patent Nos. unless otherwise indicated: Beta (U.S. Pat. No. 3,308,069), ZSM-5 (U.S. Pat. Nos. 3,702,886; 4,797,267 and 5,783,321), ZSM-11 (U.S. Pat. No. 3,709,979), ZSM-12 (U.S. Pat. No. 3,832,449), ZSM-12 and ZSM-38 (U.S. Pat. No. 3,948,758), ZSM-22 (U.S. Pat. No. 5,336,478), ZSM-23 (U.S. Pat. No. 4,076,842), ZSM-34 (U.S. Pat. No. 4,086,186), ZSM-35 (U.S. Pat. No. 4,016,245, ZSM-48 (U.S. Pat. No. 4,397,827), ZSM-58 (U.S. Pat. No. 4,698,217), MCM-1 (U.S. Pat. No. 4,639,358), MCM-2 (U.S. Pat. No. 4,673,559), MCM-3 (U.S. Pat. No. 4,632,811), MCM-4 (U.S. Pat. No. 4,664,897), MCM-5 (U.S. Pat. No. 4,639,357), MCM-9 (U.S. Pat. No. 4,880,611), MCM-10 (U.S. Pat. No. 4,623,527), MCM-14 (U.S. Pat. No. 4,619,818), MCM-22 (No. 4,954,325), MCM-41 (U.S. Pat. No. 5,098,684), M-41S (U.S. Pat. No. 5,102,643), MCM-48 (U.S. Pat. No. 5,198,203), MCM-49 (U.S. Pat. No. 5,236,575), MCM-56 (U.S. Pat. No. 5,362,697), AlPO$_4$-11 (U.S. Pat. No. 4,310,440), titanium aluminosilicates (TASO), TASO-45 (EP A 0 229 295), boron silicates (U.S. Pat. No. 4,254,297), titanium aluminophosphates (TAPO) (U.S. Pat. No. 4,500,651), mixtures of ZSM-5 and ZSM-11 (U.S. Pat. No. 4,229,424), ECR-18 (U.S. Pat. No. 5,278,345).

In another embodiment, the metalloaluminophosphate may be bound to another molecular sieve, as disclosed for example in the following: SAPO-34 bound AlPO$_4$-5 (U.S. Pat. No. 5,972,203), WO 98/57743 (molecular sieve and Fischer-Tropsch), U.S. Pat. No. 6,300,535 (MFI-bound zeolites), and meso-porous molecular sieves (U.S. Pat. Nos. 6,284,696; 5,098,684; 5,102,643 and 5,108,725). Binder may no longer be necessary in such systems.

In a further embodiment, the metalloaluminophosphate molecular sieve may be combined with a metal catalyst, for example as a Fischer-Tropsch catalyst.

Process for Using the Molecular Sieve Catalyst Compositions

The molecular sieve catalysts and compositions of the present invention are useful in a variety of processes including: cracking, hydrocracking, isomerization, polymerisation, reforming, hydrogenation, dehydrogenation, dewaxing, hydrodewaxing, absorption, alkylation, transalkylation, dealkylation, hydrodecylization, disproportionation, oligomerization, dehydrocyclization and combinations thereof.

The preferred processes of the present invention include a process directed to the conversion of a feedstock comprising one or more oxygenates to one or more olefin(s) and a process directed to the conversion of ammonia and one or more oxygenates to alkyl amines and in particular methylamines.

In a preferred embodiment of the process of the invention, the feedstock contains one or more oxygenates, more specifically, one or more organic compound(s) containing at least one oxygen atom. In the most preferred embodiment of the process of invention, the oxygenate in the feedstock is one or more alcohol(s), preferably aliphatic alcohol(s) where the aliphatic moiety of the alcohol(s) has from 1 to 20 carbon atoms, preferably from 1 to 10 carbon atoms, and most preferably from 1 to 4 carbon atoms. The alcohols useful as feedstock in the process of the invention include lower straight and branched chain aliphatic alcohols and their unsaturated counterparts.

Non-limiting examples of oxygenates include methanol, ethanol, n-propanol, isopropanol, methyl ethyl ether, dimethyl ether, diethyl ether, diisopropyl ether, formaldehyde, dimethyl carbonate, dimethyl ketone, acetic acid, and mixtures thereof.

In the most preferred embodiment, the feedstock is selected from one or more of methanol, ethanol, dimethyl ether, diethyl ether or a combination thereof, more preferably methanol and dimethyl ether, and most preferably methanol.

In the most preferred embodiment, the feedstock, preferably of one or more oxygenates, is converted in the presence of a molecular sieve catalyst composition into olefin(s) having 2 to 6 carbons atoms, preferably 2 to 4 carbon atoms. Most preferably, the olefin(s), alone or combination, are converted from a feedstock containing an oxygenate, preferably an alcohol, most preferably methanol, to the preferred olefin(s) ethylene and/or propylene.

The most preferred process is generally referred to as gas-to-olefins (GTO) or alternatively, methanol-to-olefins (MTO). In a MTO process, typically an oxygenated feedstock, most preferably a methanol containing feedstock, is converted in the presence of a molecular sieve catalyst composition into one or more olefin(s), preferably and predominantly, ethylene and/or propylene, often referred to as light olefin(s).

In one embodiment of the process for conversion of a feedstock, preferably a feedstock containing one or more oxygenates, the amount of olefin(s) produced based on the total weight of hydrocarbon produced is greater than 50 wt %, preferably greater than 60 wt %, more preferably greater than 70 wt %.

The feedstock, in one embodiment, contains one or more diluent(s), typically used to reduce the concentration of the feedstock, and are generally non-reactive to the feedstock or molecular sieve catalyst composition. Non-limiting examples of diluents include helium, argon, nitrogen, carbon monoxide, carbon dioxide, water, essentially non-reactive paraffins (especially alkanes such as methane, ethane, and propane), essentially non-reactive aromatic compounds, and mixtures thereof. The most preferred diluents are water and nitrogen, with water being particularly preferred.

The diluent, water, is used either in a liquid or a vapour form, or a combination thereof. The diluent is either added directly to a feedstock entering into a reactor or added directly into a reactor, or added with a molecular sieve catalyst composition. In one embodiment, the amount of diluent in the feedstock is in the range of from about 1 to about 99 mol % based on the total number of moles of the feedstock and diluent, preferably from about 1 to 80 mol %, more preferably from about 5 to about 50 mol %, most preferably from about 5 to about 25 mol %. In one embodiment, other hydrocarbons are added to a feedstock either directly or indirectly, and include olefin(s), paraffin(s), aromatic(s) (see for example U.S. Pat. No. 4,677,242, addition of aromatics) or mixtures thereof, preferably propylene, butylene, pentylene, and other hydrocarbons having 4 or more carbon atoms, or mixtures thereof.

The process for converting a feedstock, especially a feedstock containing one or more oxygenates, in the presence of a molecular sieve catalyst composition of the invention, is carried out in a reaction process in a reactor, where the process is a fixed bed process, a fluidised bed process (includes a turbulent bed process), preferably a continuous fluidised bed process, and most preferably a continuous high velocity fluidised bed process.

The reaction processes can take place in a variety of catalytic reactors such as hybrid reactors that have a dense bed or fixed bed reaction zones and/or fast fluidised bed reaction zones coupled together, circulating fluidised bed reactors, riser reactors, and the like. Suitable conventional reactor types are described in for example U.S. Pat. No. 4,076,796, U.S. Pat. No. 6,287,522 (dual riser), and *Fluidization Engineering*, D. Kunii and O. Levenspiel, Robert E. Krieger Publishing Company, New York, N.Y. 1977.

The preferred reactor type are riser reactors generally described in *Riser Reactor, Fluidization and Fluid-Particle Systems*, pages 48 to 59, F. A. Zenz and D. F. Othmo, Reinhold Publishing Corporation, New York, 1960, and U.S. Pat. No. 6,166,282 (fast-fluidised bed reactor), and U.S. patent application Ser. No. 09/564,613 filed May 4, 2000 (multiple riser reactor).

In the preferred embodiment, a fluidised bed process or high velocity fluidised bed process includes a reactor system, a regeneration system and a recovery system.

The reactor system preferably is a fluid bed reactor system having a first reaction zone within one or more riser reactor (s) and a second reaction zone within at least one disengaging vessel, preferably comprising one or more cyclones. In one embodiment, the one or more riser reactor(s) and disengaging vessel is contained within a single reactor vessel. Fresh feedstock, preferably containing one or more oxygenates, optionally with one or more diluent(s), is fed to the one or more riser reactor(s) in which a molecular sieve catalyst composition or coked version thereof is introduced. In one embodiment, the molecular sieve catalyst composition or coked version thereof is contacted with a liquid or gas, or combination thereof, prior to being introduced to the riser reactor(s), preferably the liquid is water or methanol, and the gas is an inert gas such as nitrogen.

In an embodiment, the amount of fresh feedstock fed separately or jointly with a vapour feedstock, to a reactor system is in the range of from 0.1 wt % to about 85 wt %, preferably from about 1 wt % to about 75 wt %, more preferably from about 5 wt % to about 65 wt % based on the total weight of the feedstock including any diluent contained therein. The liquid and vapour feedstocks are preferably the same composition, or contain varying proportions of the same or different feedstock with the same or different diluent.

The feedstock entering the reactor system is preferably converted, partially or fully, in the first reactor zone into a gaseous effluent that enters the disengaging vessel along with a coked molecular sieve catalyst composition. In the preferred embodiment, cyclone(s) within the disengaging vessel are designed to separate the molecular sieve catalyst composition, preferably a coked molecular sieve catalyst composition, from the gaseous effluent containing one or more olefin(s) within the disengaging zone. Cyclones are preferred, however, gravity effects within the disengaging vessel will also separate the catalyst compositions from the gaseous effluent. Other methods for separating the catalyst compositions from the gaseous effluent include the use of plates, caps, elbows, and the like.

In one embodiment of the disengaging system, the disengaging system includes a disengaging vessel; typically a lower portion of the disengaging vessel is a stripping zone. In the stripping zone the coked molecular sieve catalyst composition is contacted with a gas, preferably one or a combination of steam, methane, carbon dioxide, carbon monoxide, hydrogen, or an inert gas such as argon, preferably steam, to recover adsorbed hydrocarbons from the coked molecular sieve catalyst composition that is then introduced to the regeneration system. In another embodiment, the stripping zone is in a separate vessel from the disengaging vessel and the gas is passed at a gas hourly superficial velocity (GHSV) of from 1 $hr^{-1}$ to about 20,000 $hr^{-1}$ based on the volume of gas to volume of coked molecular sieve catalyst composition, preferably at an elevated temperature from 250° C. to about 750° C., preferably from about 350° C. to 650° C., over the coked molecular sieve catalyst composition.

The conversion temperature employed in the conversion process, specifically within the reactor system, is in the range of from about 200° C. to about 1000° C., preferably from about 250° C. to about 800° C., more preferably from about 250° C. to about 750° C., yet more preferably from about 300° C. to about 650° C., yet even more preferably from about 350° C. to about 600° C., most preferably from about 350° C. to about 550° C.

The conversion pressure employed in the conversion process, specifically within the reactor system, varies over a wide range including autogenous pressure. The conversion pressure is based on the partial pressure of the feedstock exclusive of any diluent therein. Typically the conversion pressure employed in the process is in the range of from about 0.1 kPaa to about 5 MPaa, preferably from about 5 kPaa to about 1 MPaa, and most preferably from about 20 kPaa to about 500 kPaa.

The weight hourly space velocity (WHSV), particularly in a process for converting a feedstock containing one or more oxygenates in the presence of a molecular sieve catalyst composition within a reaction zone, is defined as the total weight of the feedstock excluding any diluents to the reaction zone per hour per weight of molecular sieve in the molecular sieve catalyst composition in the reaction zone. The WHSV is maintained at a level sufficient to keep the catalyst composition in a fluidised state within a reactor.

Typically, the WHSV ranges from about 1 $hr^{-1}$ to about 5000 $hr^{-1}$, preferably from about 2 $hr^{-1}$ to about 3000 $hr^{-1}$, more preferably from about 5 $hr^{-1}$ to about 1500 $hr^{-1}$, and most preferably from about 10 $hr^{-1}$ to about 1000 $hr^{-1}$. In one preferred embodiment, the WHSV is greater than 20 $hr^{-1}$; preferably the WHSV for conversion of a feedstock containing methanol and dimethyl ether is in the range of from about 20 $hr^{-1}$ to about 300 $hr^{-1}$.

The superficial gas velocity (SGV) of the feedstock including diluent and reaction products within the reactor system is preferably sufficient to fluidise the molecular sieve catalyst composition within a reaction zone in the reactor. The SGV in the process, particularly within the reactor system, more particularly within the riser reactor(s), is at least 0.1 meter per second (m/s), preferably greater than 0.5 m/s, more preferably greater than 1 m/s, even more preferably greater than 2 m/s, yet even more preferably greater than 3 m/s, and most preferably greater than 4 m/s. See for example U.S. patent application Ser. No. 09/708,753 filed Nov. 8, 2000.

In one preferred embodiment of the process for converting an oxygenate to olefin(s) using a silicoaluminophosphate molecular sieve catalyst composition, the process is operated at a WHSV of at least 20 $hr^{-1}$ and a Temperature Corrected Normalized Methane Selectivity (TCNMS) of less than 0.016, preferably less than or equal to 0.01. See for example U.S. Pat. No. 5,952,538.

In another embodiment of the processes for converting an oxygenate such as methanol to one or more olefin(s) using a molecular sieve catalyst composition, the WHSV is from 0.01 hr$^{-1}$ to about 100 hr$^{-1}$, at a temperature of from about 350° C. to 550° C., and silica to Me$_2$O$_3$ (Me is a Group IIIA or VIII element from the Periodic Table of Elements) molar ratio of from 300 to 2500. See for example EP-0 642 485 B1.

Other processes for converting an oxygenate such as methanol to one or more olefin(s) using a molecular sieve catalyst composition are described in WO 01/23500 (propane reduction at an average catalyst feedstock exposure of at least 1.0).

The coked molecular sieve catalyst composition is withdrawn from the disengaging vessel, preferably by one or more cyclones(s), and introduced to the regeneration system. The regeneration system comprises a regenerator where the coked catalyst composition is contacted with a regeneration medium, preferably a gas containing oxygen, under general regeneration conditions of temperature, pressure and residence time.

Non-limiting examples of the regeneration medium include one or more of oxygen, O$_3$, SO$_3$, N$_2$O, NO, NO$_2$, NO$_2$O$_5$, air, air diluted with nitrogen or carbon dioxide, oxygen and water (U.S. Pat. No. 6,245,703), carbon monoxide and/or hydrogen. The regeneration conditions are those capable of burning coke from the coked catalyst composition, preferably to a level less than 0.5 wt % based on the total weight of the coked molecular sieve catalyst composition entering the regeneration system. The coked molecular sieve catalyst composition withdrawn from the regenerator forms a regenerated molecular sieve catalyst composition.

The regeneration temperature is in the range of from about 200° C. to about 1500° C., preferably from about 300° C. to about 1000° C., more preferably from about 450° C. to about 750° C., and most preferably from about 550° C. to 700° C. The regeneration pressure is in the range of from about 15 psia (103 kPaa) to about 500 psia (3448 kPaa), preferably from about 20 psia (138 kPaa) to about 250 psia (1724 kPaa), more preferably from about 25 psia (172 kPaa) to about 150 psia (1034 kPaa), and most preferably from about 30 psia (207 kPaa) to about 60 psia (414 kPaa).

The preferred residence time of the molecular sieve catalyst composition in the regenerator is in the range of from about one minute to several hours, most preferably about one minute to 100 minutes, and the preferred volume of oxygen in the gas is in the range of from about 0.01 mol % to about 5 mol %, based on the total volume of the gas.

In one embodiment, regeneration promoters, typically metal containing compounds such as platinum, palladium and the like, are added to the regenerator directly, or indirectly, for example with the coked catalyst composition. Also, in another embodiment, a fresh molecular sieve catalyst composition is added to the regenerator containing a regeneration medium of oxygen and water as described in U.S. Pat. No. 6,245,703.

In an embodiment, a portion of the coked molecular sieve catalyst composition from the regenerator is returned directly to the one or more riser reactor(s), or indirectly, by pre-contacting with the feedstock, or contacting with fresh molecular sieve catalyst composition, or contacting with a regenerated molecular sieve catalyst composition or a cooled regenerated molecular sieve catalyst composition described below.

The burning of coke is an exothermic reaction, and in an embodiment, the temperature within the regeneration system is controlled by various techniques in the art including feeding a cooled gas to the regenerator vessel, operated either in a batch, continuous, or semi-continuous mode, or a combination thereof. A preferred technique involves withdrawing the regenerated molecular sieve catalyst composition from the regeneration system and passing the regenerated molecular sieve catalyst composition through a catalyst cooler that forms a cooled regenerated molecular sieve catalyst composition. The catalyst cooler, in an embodiment, is a heat exchanger that is located either internal or external to the regeneration system.

In one embodiment, the cooler regenerated molecular sieve catalyst composition is returned to the regenerator in a continuous cycle, alternatively, (see U.S. patent application Ser. No. 09/587,766 filed Jun. 6, 2000) a portion of the cooled regenerated molecular sieve catalyst composition is returned to the regenerator vessel in a continuous cycle, and another portion of the cooled molecular sieve regenerated molecular sieve catalyst composition is returned to the riser reactor(s), directly or indirectly, or a portion of the regenerated molecular sieve catalyst composition or cooled regenerated molecular sieve catalyst composition is contacted with by-products within the gaseous effluent (WO 00/49106). In another embodiment, a regenerated molecular sieve catalyst composition contacted with an alcohol, preferably ethanol, 1-propnaol, 1-butanol or mixture thereof, is introduced to the reactor system, as described in U.S. Pat. No. 6,441,262.

Other methods for operating a regeneration system are in disclosed U.S. Pat. No. 6,290,916 (controlling moisture).

The regenerated molecular sieve catalyst composition withdrawn from the regeneration system, preferably from the catalyst cooler, is combined with a fresh molecular sieve catalyst composition and/or re-circulated molecular sieve catalyst composition and/or feedstock and/or fresh gas or liquids, and returned to the riser reactor(s). In another embodiment, the regenerated molecular sieve catalyst composition withdrawn from the regeneration system is returned to the riser reactor(s) directly, preferably after passing through a catalyst cooler. In one embodiment, a carrier, such as an inert gas, feedstock vapour, steam or the like, semi-continuously or continuously, facilitates the introduction of the regenerated molecular sieve catalyst composition to the reactor system, preferably to the one or more riser reactor(s).

By controlling the flow of the regenerated molecular sieve catalyst composition or cooled regenerated molecular sieve catalyst composition from the regeneration system to the reactor system, the optimum level of coke on the molecular sieve catalyst composition entering the reactor is maintained. There are many techniques for controlling the flow of a molecular sieve catalyst composition described in Michael Louge, *Experimental Techniques, Circulating Fluidised Beds*, Grace, Avidan and Knowlton, eds. Blackie, 1997 (336–337).

Coke levels on the molecular sieve catalyst composition are measured by withdrawing from the conversion process the molecular sieve catalyst composition at a point in the process and determining its carbon content. Typical levels of coke on the molecular sieve catalyst composition, after regeneration is in the range of from 0.01 wt % to about 15 wt %, preferably from about 0.1 wt % to about 10 wt %, more preferably from about 0.2 wt % to about 5 wt %, and most preferably from about 0.3 wt % to about 2 wt % based on the total weight of the molecular sieve and not the total weight of the molecular sieve catalyst composition.

In one preferred embodiment, the mixture of fresh molecular sieve catalyst composition and regenerated molecular sieve catalyst composition and/or cooled regenerated molecular sieve catalyst composition contains in the range of from about 1 to 50 wt %, preferably from about 2 to 30 wt %, more preferably from about 2 to about 20 wt %, and most preferably from about 2 to about 10 wt % coke or carbonaceous deposit based on the total weight of the mixture of molecular sieve catalyst compositions. See for example U.S. Pat. No. 6,023,005.

The gaseous effluent is withdrawn from the disengaging system and is passed through a recovery system. There are many well-known recovery systems, techniques and sequences that are useful in separating olefin(s) and purifying olefin(s) from the gaseous effluent. Recovery systems generally comprise one or more or a combination of a various separation, fractionation and/or distillation towers, columns, splitters, or trains, reaction systems such as ethylbenzene manufacture (U.S. Pat. No. 5,476,978) and other derivative processes such as aldehydes, ketones and ester manufacture (U.S. Pat. No. 5,675,041), and other associated equipment for example various condensers, heat exchangers, refrigeration systems or chill trains, compressors, knock-out drums or pots, pumps, and the like.

The metalloaluminophosphate molecular sieve materials and catalyst compositions of the present invention may be used in the manufacture of alkylamines, using ammonia. Examples of suitable processes are as described in EP 0 993 867 A1, and in U.S. Pat. No. 6,153,798.

EXAMPLES

XRD

X-ray Powder Diffractograms were recorded on Siemens D500 diffractometer with voltage of 40 kV and current of 30 mA, using a Cu target and Ni-filter ($\lambda$=0.154 nm). Elemental analysis of Al, Si, and P was performed using the Inductively Coupled Plasma (ICP) spectroscopy.

Example 1

N,N-dimethylethanolamine (DMEA) as Template

Example 1.1

The following ingredients were mixed, in sequence, and blended into a uniform gel using a microhomogenizer (Tissue Tearor Model 98730 available from Biospec Products, Inc, USA): 85 wt % $H_3PO_4$ (obtained from Aldrich Chemical Company), $H_2O$, Cabosil™ (available from Cabot Corporation, Illinois, USA), Catapal™ A (71.5 wt % $Al_2O_3$, available from CONDEA Vista Company, Texas, USA), and then N,N-dimethylethanolamine (DMEA) (obtained from Aldrich Chemical Company, USA). The molar ratio of the ingredients was as follows:

3.0 DMEA:1.0 $Al_2O_3$:0.3 $SiO_2$:1.0 $P_2O_5$:50 $H_2O$

The gel was then placed into a Parr bomb with Teflon liner, and was heated to 180° C. for 10 days with no agitation. The solid product was centrifuged and washed several times with deionized water, and was then dried in a 60° C. vacuum oven overnight to provide a silicoaluminophosphate of the CHA framework type, comprising N,N-dimethylethanolamine within its intra-crystalline structure. X-ray powder patterns of the product confirmed that the product is a silicoaluminophosphate of the CHA framework type with various degrees of crystallinity. The solid product yield is 7.70% after 10 days of crystallization, based on the weight of the starting synthesis mixture. Elemental analysis of the products gave the following molar composition $Al_{1.0}Si_{0.209}P_{0.799}$. The final product has a Si/Al ratio of 0.209 as determined by elemental analysis (using ICP—Inductively Coupled Plasma technique), which equates to a Si per CHA cage of 1.25

This example shows that relatively pure silicoaluminophosphates of the CHA framework type may be synthesized with N,N-dimethylethanolamine as template. Typically when TEAOH is used as the template in such a synthesis, the Si/Al ratio of the molecular sieve is 0.167. The Si/Al atomic ratio of the N,N-dimethylethanolamine derived product at 0.209 as determined by elemental analysis is higher than 0.167; this suggests that the N,N-dimethylethanolamine template requires more than one charge per CHA cage.

Example 1.2

The procedure is identical to Example 1.1, except that the ingredient ratio was the following: 3.0DMEA:1.0$Al_2O_3$:x$SiO_2$:1.0$P_2O_5$:50$H_2O$, wherein x=0.45 or 0.60, and the crystallization time is 5 days. The crystallization products were pure silicoaluminophosphates of the CHA framework type as judged by X-ray diffraction. The yields were 11.3% in both cases, based on the gel weight. The product compositions were determined as $Al_{1.0}Si_{0.268}P_{0.749}$ and $Al_{1.0}Si_{0.308}P_{0.727}$, for x=0.45 and 0.60, respectively. This example illustrates that the Si/Al atomic ratio may be as much as 0.308 when DMEA is used as template.

Example 1.3

The same ingredients, sequence of mixing and gel preparation procedure were used as in Example 1, except that the ingredient ratio was changed to the following: 2.0DMEA:1.0$Al_2O_3$:0.6$SiO_2$:1.0$P_2O_5$:30$H_2O$.

The gel was then aged for 24 hours at room temperature before being placed into a Parr bomb with Teflon liner, and was heated to 180° C. for various times. The solid product was centrifuged and washed several times with deionized water, and was then dried in a 60° C. vacuum oven overnight. X-ray powder patterns of the products confirmed that the products were silicoaluminophosphates of the CHA framework type (see FIG. 1). The solid product yield is 11.6%, 12.5%, and 17.3% (based on the weight of the starting synthesis mixture) after 2, 4, and 5 days of crystallization, respectively. Elemental analysis of the products gave the following molar composition: $Al_{1.0}Si_{0.279}P_{0.701}$, $Al_{1.0}Si_{0.283}P_{0.708}$, and $Al_{1.0}Si_{0.304}P_{0.697}$ for products obtained after 2, 4, and 5 days of crystallization, respectively. These products had Si/Al ratios of 0.279, 0.283 and 0.304, respectively.

Example 2

Mixture of N,N-dimethylethanolamine (DMEA) and Tetraethylammonium Hydroxide (TEAOH) as Templates The same procedure as in Example 1.2 is used except that TEAOH is added to the reaction mixture after all the other ingredients. The molar ratio of the ingredients used is as follows:

1.5 DMEA:0.5TEAOH:10.0$Al_2O_3$:0.3$SiO_2$:1.0$P_2O_5$:50$H_2O$

The mixture is homogenized, aged at room temperature for 24 hours, and then sealed in a Teflon lined Parr bomb before it is heated to 180° C. for 5 days. The solid product is centrifuged and washed several times with deionized water, and is dried in a 60° C. vacuum oven. The X-ray powder diffraction pattern indicates that after 5 days of crystallization, pure silicoaluminophosphates of the CHA framework type is obtained. The yield of silicoaluminophosphates of the CHA framework type is 10.6 wt %, based on the total weight of the starting mixture.

Elemental analysis of the product obtained after 5 days of crystallization gives the following results: Al, 17.8%; Si, 3.51%; P, 16.4%, which corresponds to the following composition: $Al_{1.0}Si_{0.189}P_{0.803}$. Thus the product after 5 days had an Si/Al ratio of 0.189 which indicates a low level of Si per CHA cage of less than 1.25.

This example shows that DMEA can be mixed with known templates for silicoaluminophosphates of the CHA framework type (TEAOH), for the synthesis of silicoaluminophosphates of the CHA framework type having Si content intermediate between those obtained with either templates alone, given a constant starting Si content in the synthesis mixture. TEAOH alone typically provides an Si/Al of 0.167 whereas DMEA alone provides a Si/Al ratio of greater than 0.2.

Example 3

A Mixture of N,N-dimethylethanolamine (DMEA) and Tetraethylammonium Chloride (TEACl) as Templates Example 3a The following ingredients were mixed, in sequence, and blended into a uniform greyish thin gel using a microhomogenizer: 85 wt % $H_3PO_4$, $H_2O$, Cabosil™, Catapal™, and then N,N-dimethylethanolamine (DMEA) and tetraethylammonium chloride (TEACl, obtained from Aldrich Chemical Company, USA). The molar ratios of the ingredients were as follows:

2.0DMEA:1.0TEACl:1.0$Al_2O_3$:0.3$SiO_2$:1.15 $P_2O_5$:50$H_2O$

The gel was then placed into a Parr bomb with Teflon liner, and was heated in a tumbling oven (60 rpm) to 180° C. for 3 and 5 days. The solid product was centrifuged and washed several times with deionized water, and then dried in a 60° C. vacuum oven overnight. X-ray powder diffraction patterns of the products confirm that the product is silicoaluminophosphates of the CHA framework type. The solid product yield was 16.4% and 11.9% after 3 and 5 days of crystallization, respectively, based on the weight of the starting synthesis mixture. Elemental analysis of the products gives the following molar composition: $Al_{1.0}Si_{0.149}P_{0.838}$ and $Al_{1.0}Si_{0.151}P_{0.847}$ for products obtained after 3 and 5 days of crystallization, respectively. The resultant products had Si/Al ratios of 0.149 and 0.151, which are both indicative of low Si per CHA cage values of less than 1.

This example illustrates that tetraethylammonium hydroxide may be replaced with tetraethylammonium chloride when used in combination with DMEA to provide a silicoaluminophosphate of the CHA framework type, in good yield and with unexpected low silicon content (0.9 Si per CHA cage).

Example 3b

The above procedure was repeated twice, except that the molar ratio of the ingredients was as follows:

2.0DMEA:1.0TEACl:1.0$Al_2O_3$:0.1 or 0.2$SiO_2$:1.15 $P_2O_5$:52$H_2O$

The gel was placed into a Parr bomb with Teflon liner, and was heated in a tumbling oven (60 rpm) to 170° C. for 3 days. The solid product was centrifuged and washed several times with deionized water, and was then dried in a 60° C. vacuum oven overnight. X-ray powder patterns of the products indicate that the product with 0.1 $SiO_2$ was moderately crystalline SAPO-34 with minor crystalline impurity whereas the one with 0.2 $SiO_2$ was highly crystalline, pure SAPO-34. The solid product yield was 10.0% and 11.4% for 0.1 $SiO_2$ and 0.2 $SiO_2$, respectively, based on the weight of the starting synthesis mixture. Elemental analysis of the product with 0.2 $SiO_2$ gives the following molar composition: $Al_{1.0}Si_{0.127}P_{0.881}$, which corresponds to 0.76 Si per CHA cage (0.127/0.167).

This example illustrates that tetraethylammonium halides can be used in combination with DMEA to make pure SAPO-34 in good yield, and the product has a silicon level of 0.76 Si per CHA cage, a true low Si pure SAPO-34.

Example 4

3-(N,N-dimethylamino)-1-propanol as Template

The mixing procedure of Example 1.1 was repeated, using 3-(N,N-dimethylamino)-1-propanol (also known as dimethylpropanolamine, DMAP-1) as template. The molar ratio of ingredients used was as follows: 3.0(DMAP-1):1.0$Al_2O_3$:0.3$SiO_2$:1.0$P_2O_5$:40$H_2O$.

Three Parr® bombs containing the homogenized gel were heated to 170° C. while being tumbled at 60 rpm. The bombs were taken out and cooled, one by one, after 7, 13, and 20 days, and the solid products were processed as in Example 1.1.

Figure 2:
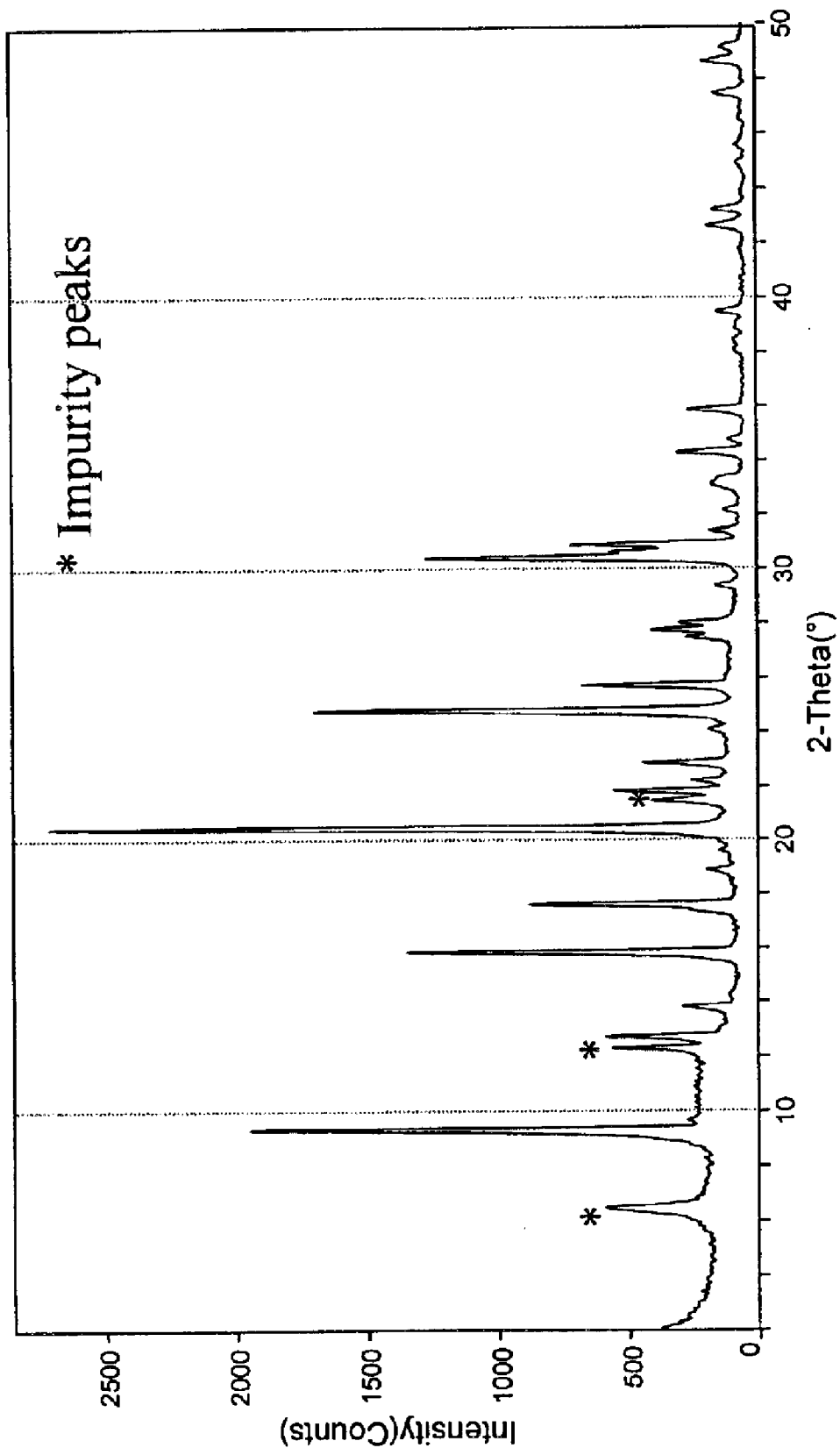
FIG. 2 shows the XRD pattern of a crystalline silicoaluminophosphate molecular sieve of CHA framework type comprising N,N-dimethylpropanolamine within its intra-crystalline structure.

The X-ray powder patterns of the product confirm that the major product after 5 days of crystallization was a silicoaluminophosphate of the CHA framework type (FIG. 2). After 13 days of crystallization a substantial amount of an impurity phase grew in, and after 20 days of crystallization the impurity became the predominant product.

Example 5

1-(N,N-dimethylamino)-2-propanol as Template

The procedure of Example 4 was repeated with 1-(N,N-dimethylamino)-2-propanol (DMAP-2) as template. The molar ratio of the ingredients used was as follows: 3.0 (DMAP-2):1.0$Al_2O_3$:0.3$SiO_2$:1.0$P_2O_5$:40$H_2O$.

Figure 3:
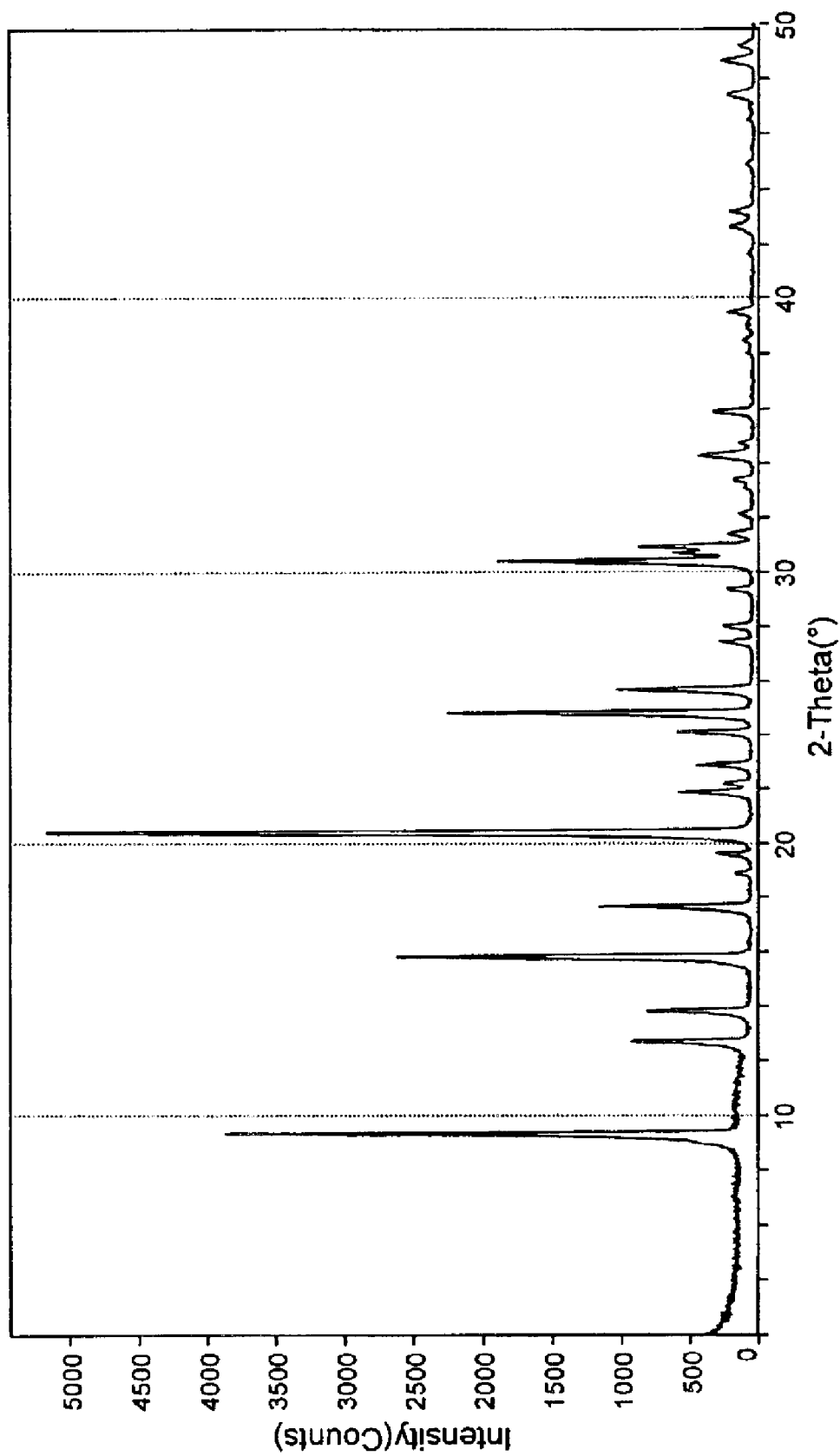
FIG. 3 shows the XRD pattern of a crystalline silicoaluminophosphate molecular sieve of CHA framework type comprising 1-(N,N-dimethylamino)-2-propanol within its intra-crystalline structure.

X-ray powder diffraction pattern of the products confirmed that the product obtained after 7 days of crystallization was a silicoaluminophosphate of the CHA framework type (FIG. 3). The solid product yield was 7.9%, based on the weight of the starting synthesis mixture. Elemental analysis of the products gave the following molar composition: $Al_{1.0}Si_{0.240}P_{0.796}$.

All patents, test procedures, and other documents cited herein, including priority documents, are fully incorporated herein by reference to the extent such disclosure is not inconsistent with this invention and for all jurisdictions in which such incorporation is permitted.

What is claimed is:

1. A process for preparing a crystalline silicoaluminophosphate molecular sieve of CHA framework type, the process comprising:

(a) forming a reaction mixture comprising a source of aluminum, a source of phosphorus, a source of silicon and at least one organic template which comprises one or more N,N-dimethylamino moieties selected from one or more of N,N-dimethylethanolamine, N,N-dimethylpropanolamine, N,N-dimethylbutanolamine, N,N-dimethylheptanolamine, N,N-dimethylhexanolamine, N,N-dimethylethylenediamine, N,N-dimethylbutylenediamine, N,N-dimethylheptylenediamine, N,N-dimethylhexylenediamine 1-dimethylamino-2-propanol, N,N-dimethylethylamine, N,N-dimethylpropylamine, N,N- dimethylpentylamine, N,N-dimethylhexylamine and N,N-dimethylheptylamine; and (b) inducing crystallization of crystalline molecular sieve of CHA framework type.

2. The process of claim 1, wherein the template is selected from one or more of N,N-dimethylethanolamine, N,N-dimethylethylenediamine, N,N-dimethylpropanolamine, N,N-dimethylpropyelenediamine and 1-dimethylamino-2-propanol.

3. The process of claim 2, wherein the template is N,N-dimethylethanolamine.

4. The process of claim 1, wherein an organic template containing tetraethylammonium cations is used in combination with the organic template which comprises one or more dimethylamino moieties.

5. The process of claim 4, wherein the organic template containing tetraethylammonium cations is selected from the group consisting of tetraethylammonium chloride, tetraethylammonium bromide, tetraethylammonium fluoride and mixtures thereof.

6. The process of claim 5, wherein the organic template containing tetraethylammonium cations is tetraethylammonium chloride.

7. The process of claim 1, wherein the ratio of template to alumina is within the range of from 1.0:1.0 to 3.0:1.0.

8. The process of claim 1, wherein the ratio of template to alumina is within the range of from 1.5:1.0 to 3.0:1.0.

9. The process of claim 1, further comprising the steps of recovering and calcining the crystalline molecular sieve of CHA framework type to provide an activated silicoaluminophosphate of CHA framework type.

10. A silicoaluminophosphate molecular sieve, substantially of CHA framework type, comprising within its intra-crystalline structure at least one template which contains one or more N,N-dimethylamino moieties.

11. The silicoaluminophosphate molecular sieve of claim 10, wherein the template which contains one or more N,N-dimethylamino moieties is selected from one or more of N,N-dimethylethanolamine, N,N-dimethylpropanolamine, N,N-dimethylbutanolamine, N,N-dimethylheptanolamine, N,N-dimethylhexanolamine, N,N-dimethylethylenediamine, N,N-dimethylbutylenediamine, N,N-dimethylheptylenediamine, N,N-dimethylhexylenediamine 1-dimethylamino-2-propanol, N,N-dimethylethylamine, N,N-dimethylpropylamine, N,N-dimethylpentylamine, N,N-dimethylhexylamine and N,N-dimethylheptylamine.

12. A process for forming a molecular sieve catalyst composition, the process comprising combining at least one molecular sieve as claimed in claim 10 with at least one formulating agent.

13. A formulated molecular sieve catalyst composition comprising at least one silicoaluminophosphate molecular sieve as claimed in claim 10 in admixture with at least one formulating agent.

14. A silicoaluminophosphate molecular sieve, substantially of CHA framework type, comprising N,N-dimethylethanolamine within its intra-crystalline structure.

15. A crystalline silicoaluminophosphate molecular sieve having a characteristic X-ray powder diffraction pattern containing at least the d-spacings as set forth in Table Ia.

16. The molecular sieve of claim 15, having a characteristic X-ray powder diffraction pattern containing at least the d-spacings as set forth in Table Ib.

17. The molecular sieve of claim 16, comprising N,N-dimethylethanolamine within its intra-crystalline structure.

* * * * *